(12) United States Patent
King et al.

(10) Patent No.: US 7,904,898 B2
(45) Date of Patent: Mar. 8, 2011

(54) PATHWAY-SPECIFIC, REGISTRY-INTEGRATED DOMAIN NAME REGISTRATION SYSTEM

(75) Inventors: Raymond King, Portland, OR (US);
Len Bayles, Salt Lake City, UT (US);
Blake Biesecker, Portland, OR (US)

(73) Assignee: Snapnames. Com, Inc., Porland, OR (US)

(*) Notice: Subject to any disclaimer, the term of this patent is extended or adjusted under 35 U.S.C. 154(b) by 963 days.

(21) Appl. No.: 10/641,395

(22) Filed: Aug. 13, 2003

(65) Prior Publication Data
US 2004/0172463 A1 Sep. 2, 2004

Related U.S. Application Data

(60) Provisional application No. 60/403,497, filed on Aug. 13, 2002.

(51) Int. Cl.
*G06F 9/44* (2006.01)
(52) U.S. Cl. .......................... 717/171; 717/121; 717/176
(58) Field of Classification Search .......... 717/100–101, 717/163–165, 120–121, 168–171, 174–178; 709/203, 223, 226
See application file for complete search history.

(56) References Cited

U.S. PATENT DOCUMENTS

| | | | |
|---|---|---|---|
| 5,764,906 A | 6/1998 | Edelstein et al. | |
| 5,987,464 A | 11/1999 | Schneider | |
| 5,999,915 A | 12/1999 | Nahan et al. | |
| 6,009,459 A | 12/1999 | Belfiore et al. | |
| 6,249,767 B1 | 6/2001 | Okayama et al. | |
| 6,298,341 B1 * | 10/2001 | Mann et al. ........................ 707/3 |
| 6,338,082 B1 | 1/2002 | Schneider | |
| 6,442,549 B1 | 8/2002 | Schneider | |
| 6,678,717 B1 * | 1/2004 | Schneider ..................... 709/203 |
| 6,760,746 B1 * | 7/2004 | Schneider ..................... 709/203 |
| 6,880,007 B1 * | 4/2005 | Gardos et al. ................. 709/225 |
| 7,000,028 B1 * | 2/2006 | Broadhurst et al. .......... 709/245 |
| 7,069,323 B2 * | 6/2006 | Gardos et al. ................. 709/225 |
| 7,130,878 B2 * | 10/2006 | Parsons et al. ................ 709/202 |
| 2002/0010795 A1 | 1/2002 | Brown | |
| 2002/0065903 A1 | 5/2002 | Fellman ......................... 709/220 |
| 2002/0091703 A1 * | 7/2002 | Bayles .......................... 707/101 |

FOREIGN PATENT DOCUMENTS

| | | |
|---|---|---|
| WO | WO 99/09726 | 2/1999 |
| WO | WO 01/17192 A2 | 3/2001 |
| WO | WO 01/22286 A1 | 3/2001 |
| WO | WO 01/97486 | 12/2001 |

OTHER PUBLICATIONS

PCT International Search Report dated Mar. 25, 2004 for International Application No. PCT/US03/25359.
VeriSign, "The Extensible Provisioning Protocol—XML Trust Services," White paper, 2000, 6 pages, Mountain View, California.

* cited by examiner

*Primary Examiner* — Ted T Vo
(74) *Attorney, Agent, or Firm* — Stolowitz Ford Cowger LLP

(57) ABSTRACT

Embodiments of the present invention reliably effect successive registrations of a domain name through implementing a backorder system (504) integrated with the registry (520) maintaining the current registration for the domain name. Because the backorder system (504) is directly integrated with the registry (520), a successful new registration can be achieved following the lapse of the current registration. The registry can employ modified registration control logic and new and modified registry commands (324). These modifications to the standard registration system enable a registry (520) to limit successive registrations of the domain name to an entity, such as a registrar (500), that employs the backorder service (504).

43 Claims, 8 Drawing Sheets

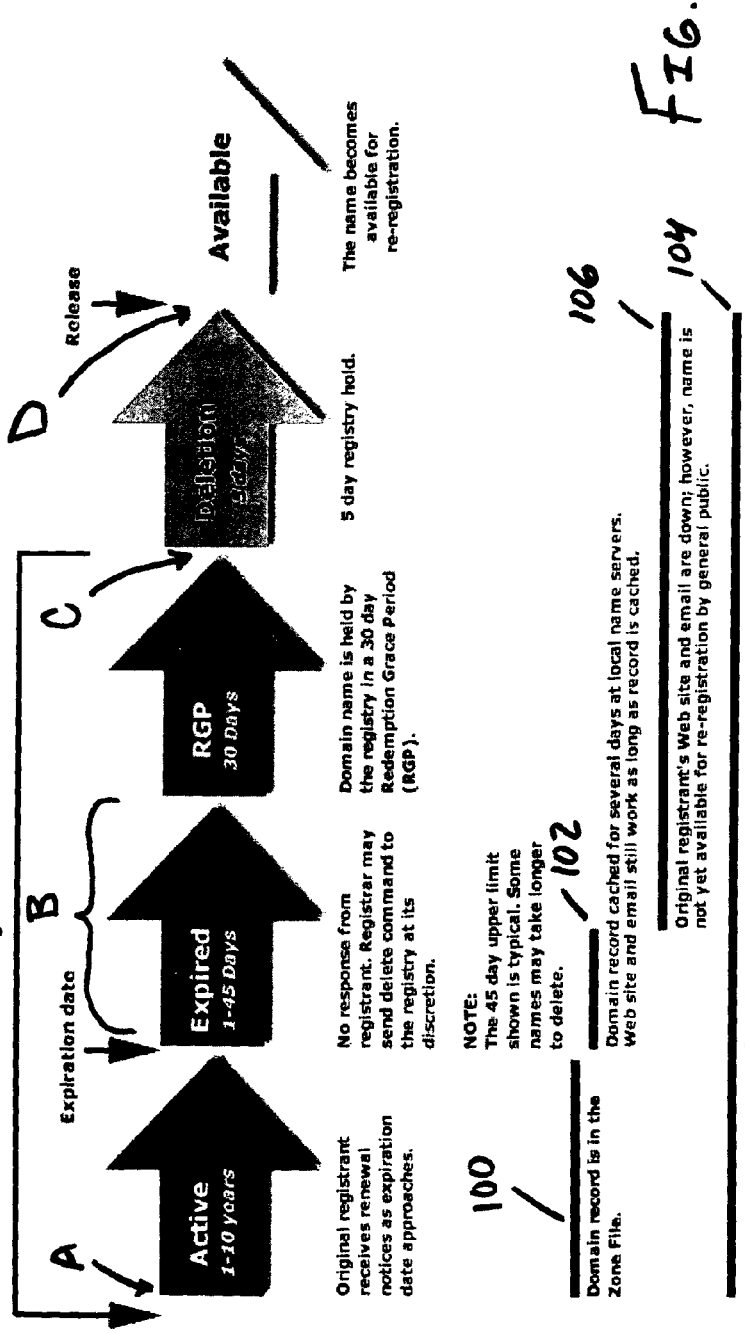

The Registration & Deletion Cycle

This chart illustrates the typical deletion cycle only.
There are exceptions which are not covered by this diagram.

Customer Renews Name
Typically, customers have the opportunity to renew during this timeframe.

A → Active 1-10 years
B → Expired 1-45 Days
C → RGP 30 Days
D → *Deletion* 5 days — Release + Block → Restrictively Available

E: (entire cycle bracket)

Active:
Original registrant receives renewal notices as expiration date approaches.
Domain record is in the Zone File. — 200

Expired:
No response from registrant. Registrar may send delete command to the registry at its discretion.
NOTE: The 45 day upper limit shown is typical. Some names may take longer to delete.
Domain record cached for several days at local name servers. Web site and email still work as long as record is cached. — 202

RGP:
Domain name is held by the registry in a 30 day Redemption Grace Period (RGP).
Original registrant's Web site and email are down; however, name is not yet available for re-registration by general public.

Deletion:
5 day registry hold.
Domain record is in the Shared Registry System (SRS). Once deleted from the SRS, it is available to be re-registered. — 206

Restrictively Available:
The name becomes available for re-registration by backorder system. — 204

FIG. 2

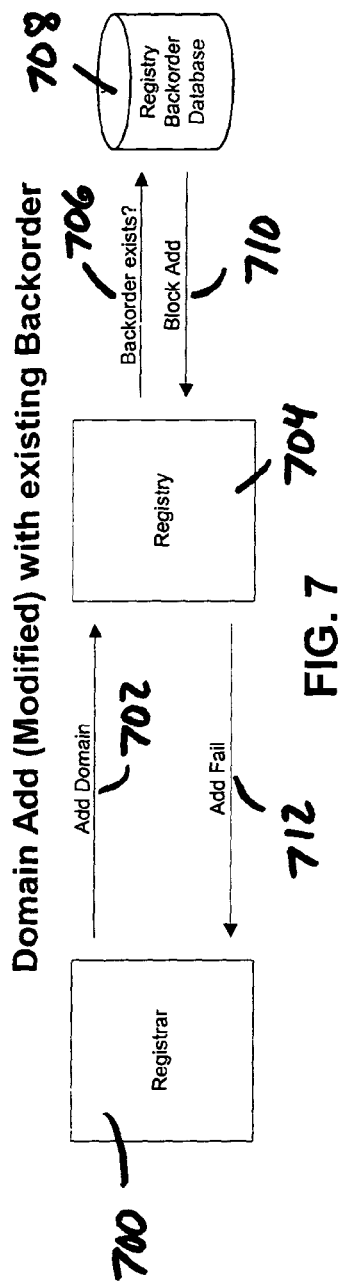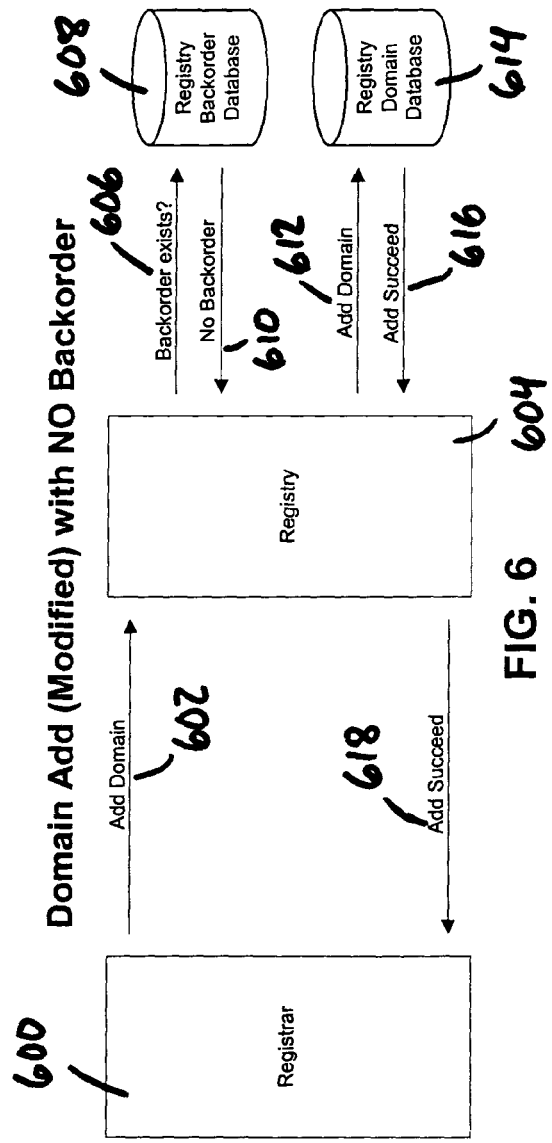

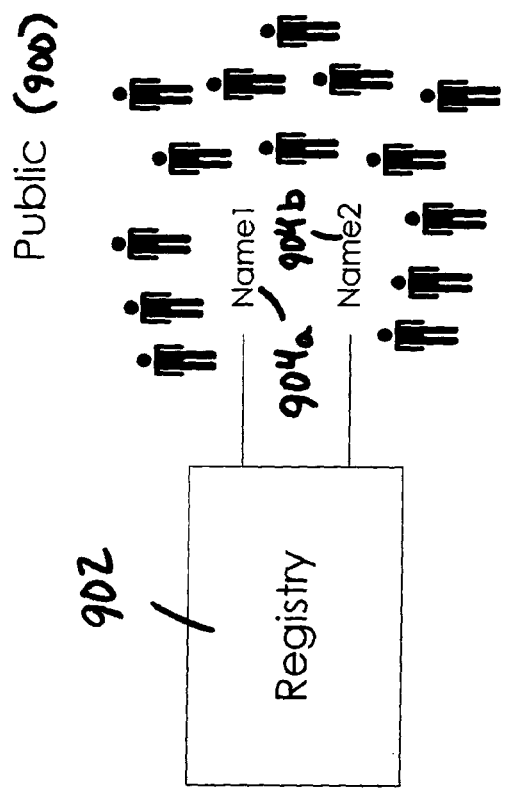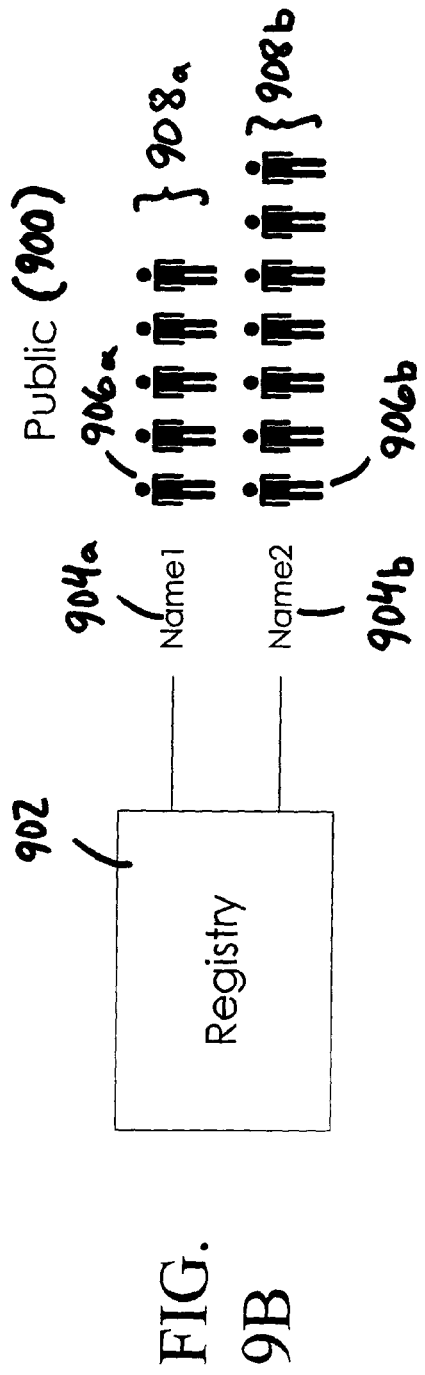
FIG. 9A
FIG. 9B

PATHWAY-SPECIFIC, REGISTRY-INTEGRATED DOMAIN NAME REGISTRATION SYSTEM

RELATED APPLICATIONS

This application claims priority from U.S. Provisional Patent Application No. 60/403,497, filed Aug. 13, 2002, which is hereby incorporated by reference in its entirety.

COPYRIGHT NOTICE

©2003 SnapNames.com, Inc. A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. 37 CFR §1.71(d), (e).

TECHNICAL FIELD

The present invention is concerned with the processing of successive registrations for unique identifiers on distributed or remote computerized networks and, more particularly, to technology and services integrated with Internet domain name registry systems to enable advance, orderly processing of backorder requests to register domain names upon the current registrations lapsing.

BACKGROUND OF THE INVENTION

In distributed computer networks, being able to locate individual computers, servers, or various other machines on the network is critical. On the Internet, one of the most valuable identification resources is the domain name. Internet domain names provide a convenient way to reference Internet Protocol (IP) numerical addresses. Presently, IP addresses are 32-bit integers. They comprise four numbers separated by periods. Every "host" machine (e.g., computer, etc.) connected to the Internet must be identifiable by a specific numerical IP address. However, people prefer to reference host machines by pronounceable, easily remembered names, referred to as "domain names." The Internet implements a Domain Name System ("DNS") to facilitate matching specific domain names to specific hosts.

The DNS is a distributed database system that allows computer applications to map between domain names and IP addresses. The DNS also provides electronic mail routing information and many other services. Individual components of the DNS distributed database can be cached locally, or stored on any of numerous distributed machines. The DNS database data correlates each domain name to a specific numeric IP address. If a computer's local cache does not have the information to resolve a domain name into an IP address, it sends a request to other computers that may contain the resolution information. The DNS affords a domain name some measure of independence from the physical location of a host. The host can be moved to a new location on the network, but it can still be accessed using the same domain name. As long as a user can remember the domain name, the host can always be located, even if the IP address changes over time. This illustrates the value of a domain name that is easy to remember.

Physically, the DNS comprises many servers and other computers that run software and store data permitting computers to query the DNS database. One such machine is the "root server." A root server is a server computer that maintains the software and data necessary to locate "name servers" that contain authoritative data for a specific domain, such as the ".com" top level domain. There are presently thirteen root servers throughout the world. Name servers are computers that have the software and data to resolve the domain name into an IP address. The data accessible through the name server is often referred to as a "zone file." A "zone" is a subset of the total domain name space. The domain names in that subset are stored in the zone file for that name server. There is a zone file for each domain space (i.e., zone).

The DNS is organized in a hierarchical, tree structure. A domain name is the label representing a specific domain within the total possible domain space available in the DNS. The highest level in the DNS hierarchy is the "root," which is technically unnamed but often referred to as the "." or "dot." The level immediately below the root in the DNS hierarchy is the top-level domain, or "TLD." It is called the "top-level domain" because it is the highest level in the hierarchy after the root. The TLD appears furthest to the right in an English-language domain name. For example, "gov" in the "uspto.gov" domain name. There are various types of TLDs. The term "gTLD" is often interchangeably used to refer to a "global top-level domain" or a "generic top-level domain." A global TLD is one that can be registered by an entity regardless of the entity's geographic location or political boundary. For example, a person, corporation, or other entity located anywhere in the world can register a name in the ".com" domain. However, because an entity must have a presence in the United Kingdom to register a name in the ".uk" TLD, that domain is not a global TLD. Similarly, a generic TLD represents a domain in which an entity can register a name regardless of what type of entity it is. For example, because any entity can register a name in the ".com" domain, while only military entities can register a name in the ".mil" domain, the ".com" domain is an example of a generic TLD and the ".mil" domain is an example of a "specific TLD." The ".uk" domain is also an example of a "country code" TLD, or "ccTLD," applicable to the United Kingdom. Other examples of ccTLDs include ".fr" for France, ".ca" for Canada, ".jp" for Japan, and ".us" for the United States of America.

By registering a domain name in a particular TLD, the TLD is sub-divided into lower levels in the DNS hierarchy. A second-level domain ("SLD") is the level in the DNS hierarchy immediately below the TLD. An example of a second-level domain would be "snapnames" in the "snapnames.com" domain name. The level in the DNS hierarchy immediately below the second-level domain is the third-level domain. An example of the third-level domain would be "portland" in the "portland.or.us" domain name. Further subdivisions can be created in a similar manner. Domain names at each level of the hierarchy must be unique. Thus, while there can be only one "snapnames" registered in the ".com" TLD, there can be a "snapnames.net" domain name in addition to the "snapnames.com" domain name.

Historically, domain name registration has been conducted through a Shared Registration System ("SRS") involving registries, registrars, and registrants. The SRS was created by Network Solutions, Inc. in 1999 to provide a registry backend through which multiple, globally diverse registrars could register domain names. The term "registry" refers to the entity responsible for managing allocation of domain names within a particular name space, such as a TLD. One example of a registry is the VeriSign registry for the .com, .org, and .edu TLDs. The term "registrar" refers to any one of several entities with authority to issue commands or requests to add, edit, or delete registrations to or from the registry for a name space.

Entities that wish to register a domain name do so through a registrar. The term "registrant" refers to the entity registering the domain name. In some name spaces, the registry and registrar functions can be performed by the same entity. The combined registry-registrar model is implemented in many ccTLDs. The overall registration system, including multiple registries, is overseen by the Internet Corporation for Assigned Names and Numbers ("ICANN"). ICANN is a non-profit corporation that was formed to assume responsibility for the IP address space allocation, protocol parameter assignment, domain name system management, and root server system management functions previously performed under U.S. Government contract by the Internet Assigned Numbers Authority ("IANA") and other entities.

Domain names, or more specifically domain name registrations, have become significant business (and personal) assets. Registration rights are now bought, sold, traded, bartered, auctioned and stockpiled in "inventories." Some domain names have been transferred for consideration on the order of tens or even hundreds of thousands of U.S. dollars. At the time of this writing, Verisign, Inc. (the company that maintains the .com, .net, and .org gTLD registry) reports over 32 million registrations in its database. Industry statistics indicate, however, that only about 10% of the domain names registered are currently in actual use, including more than just a simple holding or redirection page. Many registrations are the work of speculators.

The actual cost to register an available domain name at present is relatively nominal, averaging around $35 or less per year. This charge is assessed by the domain name registrar to attend to entering the registration on the registry, and to maintain corresponding records. It represents a markup over the wholesale fee charged by the registry. There are numerous qualified registrars for the common gTLDs, so the market for this service is competitive. The registrar business can be viable because it can be largely automated and operated through a Web site so that direct costs are low. Volume is key, however, so much effort and money is spent on advertising and various relationships with other sites to attract "traffic." The leading registrars today each process on the order of a few million registrations or renewals per year.

New gTLDs are being added as the older ones (such as .com, .net, and .org) become saturated. The realm of possible names under a given gTLD is not the problem, it is immense. Names of up to 67 characters long, plus the extension, can be registered. The trouble is that popular, easy to remember or easy to recognize names are relatively limited in number. Many of the most desirable domain names, those corresponding to well-known trademarks or generically describing commercial goods or services, have been long since registered in the basic gTLD spaces.

Acquisition of a desirable domain name requires current information as the registry is changing constantly. Each registry operator disseminates updates to the corresponding domain name resolution servers around the world on at least a daily basis. One can expect this update frequency to rise toward substantially continuous. The public can access the registry directly in a "read only" fashion; in other words, the public can view information but not change it. Presently, this ability is generally implemented by the registry maintaining a public Web site (or ftp site) where anyone can get information. The WHOIS lookup, or similar functions provided by the registry or individual registrars, can be used to identify the registrant of a given domain name. Various sites now offer these kinds of lookups, though they merely query the actual registries and/or registrar databases to acquire the data.

The challenge arises in that many users or entities are "watching" for availability of the very same names at the very same registries. The "winner" is the registrar (or individual scripting through the registrar's connections to the registry) who can register the newly released name before anyone else. It may have substantial resale value. Indeed, the registrar likely already has a buyer in the queue to whom to register the domain name. In any event, grabbing the name is a high-tech race where only first place wins. It is considered common knowledge in the industry that the winners are nearly always technologically sophisticated professional speculators, who either script through a registrar's connections without the registrar's knowledge, or strike arrangements with registrars for preferential access. It is also axiomatic that the average domain buyer has practically no chance of registering a valuable deleting name, a state of affairs the present invention would remedy.

To effect a registration (or renewal), domain name registrants or users must work through a qualified registrar; registrants do not typically have direct access to the registry (except a read-only lookup or search). In large part, this is due to the implementation of an SRS. There is only one registry for each gTLD, as domain names must be unique globally. Each registrar qualified to service a particular gTLD has electronic access—typically a secure digital communication channel—for interacting with the corresponding registry, for example to enter or purge a domain name registration. A registration is purged, for example, if the registrant does not timely pay a renewal fee (after a grace period).

The link between a registrar and the registry employs a Registry-Registrar Protocol ("RRP"), a commercial example of which is the Verisign Global Registry RRP. This link into the registry is how registrars monitor the status of registered names. Various protocols can be used, one example being the Verisign EPP (Extensible Provisioning Protocol), which is an XML implementation for domain name related queries. As known to those of skill in the art, suitable alternative or future protocols could be employed.

A registrar employing a RRP communications link with the registry may implement any of several possible registry commands. These can be RRP or WHOIS event commands that instruct the registry as to the modifications that should be made to a particular domain name registration record. For example, typical registry commands include the ability to add a domain name registration, delete a registration, modify the contact information for a registration, renew a registration, check the status of a registration, or transfer a registration.

Typically, the registry operator is contractually obligated to give all registrars equal access. For example, the ICANN (Unsponsored TLD) Registry Agreement provides in pertinent part: "Registry Operator shall provide all ICANN-Accredited Registrars that have Registry-Registrar Agreements in effect, and that are in compliance with the terms of such agreements, equivalent access to Registry Operator's Registry Services, including to its shared registration system." The complete contract can be found at: http://www.icann.org/tlds/agreements/unsponsored/registry-agmt-11may01.htm.

Because many registrars have a high-speed, efficient communication link to the registry, and assuming each employs an efficient communication protocol, successful registration of a domain name after deletion of the prior registration is still basically left to chance. To be reliably successful at acquiring domain names, a registrar needs a way to get ahead of its competitors.

FIG. 1 illustrates the typical deletion cycle for a registered domain name, although various exceptions or alternatives are possible. One such exception has been with the deletion cycle for which Network Solutions, Inc. served in both the registrar and registry capacity for a particular domain name. Expired domains names were deleted from the purge queue in a much less predictable fashion. However, more typically, FIG. 1 emphasizes four primarily timing events. At point A, a domain name is registered. At point B, the domain name registration expires. At point C, the registrar deletes the domain name record. At point D, the registry purges the deleted domain name record. The period between the points A and B can be up to ten years, in one-year intervals. The registrant typically receives renewal notices from the registrar as the expiration date approaches. If there is no response or renewal from the registrant, the registration expires at point B. When this occurs, the registry will automatically renew the domain. The registrar will now have a window of approximately thirty to forty-five days, sometimes longer (the period between B and C), in which to delete the domain and effectively cancel the registry's auto-renewal. If the registrar does not cancel the registration before point C, the domain will be renewed for a one-year period and the registrar is committed to the fee charged by the registry for a one-year registration.

During the period between points B and C, the registrar may opt to put the domain on "registrar-hold." This hold will remove the domain from the global Domain Name Servers, effectively disabling the domain unless the registrar is paid for the renewal. If the registrar deletes the domain before point C, the domain will exist in a purge queue at the registry for approximately 120 hours (between points C and D) before final deletion. In this state, the domain name is not available for registration and will not be active. After point D, registration of the domain is "up for grabs" on a first-come, first-served basis through any authorized registrar.

Until the registration expires 100, the domain record is in the zone file for the relevant domain. For a short period after the expiration 102, the domain record is still cached at local root name servers, but propagation of the change across all servers is not complete. Services such as a Web site and e-mail for that domain name will still work while the domain is listed in the root name servers. After the domain name record is off the name servers, any associated Web site and e-mail stop functioning. During the period 104 between the domain name being registered and the registration being purged, the record is still in the SRS. After the name is no longer in the SRS, it is available for a subsequent registration. For the period 106 after the record is no longer in the root servers but before it is purged, the Web site and e-mail for that domain name no longer function, but the name is not available for registration by the general public.

As can be seen with reference to FIG. 1, punctual timing can be crucial when trying to register a recently available domain name. As such, and given the stiff competition, it has typically been very difficult to ensure a successful registration for a deleting domain name under the registration system of the prior art. The present invention addresses this concern.

SUMMARY OF THE INVENTION

Embodiments of the present invention implement a domain name backordering service and domain name backorder management system to receive and process one or more requests for backordering a domain name that has a current registration being maintained by a registry. The backorder system can be a global system, meaning that it can be implemented as a single provider of backorder services for multiple registries. The backorder system can also simultaneously serve any number of accredited registrars. The backordering services can be made available to registrars (to backorder a registration on behalf of a registrant), or they can be made available to registrants directly. One example in which backorder requests can be effectively received from registrants is for systems in which the typical registrar and registry functions are combined in a single entity (such as in some country code domains). Those skilled in the relevant art will readily appreciate that embodiments of the present invention can be implemented equally well in thick or thin registry models as well.

One aspect of the present invention enables reliably effecting successive registrations of a domain name through implementing a backorder system integrated with the registry maintaining the current registration for the domain name. Because the backorder system is integrated with the registry, a successful subsequent registration is essentially assured following the lapse of the current registration.

In another aspect of the present invention, the registry implements modified registration control logic and new and modified registry commands. These modifications to the standard registration system enable a registry to preclude successive registrations by entities not using the freely-available backorder service. A backorder management system can offer the backordering services equally to all registrars, on a first-come, first-served basis, thus satisfying the registry's legal and contractual requirements of making its registration services equally available to all registrars, while still establishing an efficient and orderly system to effect successive registrations for a domain name.

It is another aspect of the present invention that employing a backorder system, as described herein, enables orderly processing of multiple requests for successive registrations for a domain name. A backorder management system integrated with the registry can preserve or process the multiple backorder requests in a backordering queue, and offer successive registrations based on the prospective registrant's position in the queue. Such a system enables neat and orderly processing of domain name registrations, as opposed to the speculative rush-to-registration suffered with prior system.

Additional aspects and advantages of this invention will be apparent from the following detailed description of preferred embodiments, which proceeds with reference to the accompanying drawings.

BRIEF DESCRIPTION OF THE DRAWINGS

FIG. 1 illustrates a domain name deletion cycle typical of the prior art.

FIG. 2 illustrates a domain name deletion cycle of FIG. 1 as modified consistent with the present invention.

FIG. 6 shows a communication flow diagram for requesting a successive registration for a domain name that does not have a corresponding backorder request.

FIG. 7 depicts a communication flow diagram for requesting a successive registration for a domain name for which a backorder has been stored with the registry via a process similar to that shown in FIG. 5.

FIG. 9A illustrates the disorganization of a typical domain name registration system implementing a "rush-to-register" methodology.

FIG. 9B illustrates improvements of the present invention over the system depicted in FIG. 9A, by processing multiple backorder requests in an orderly queue.

DETAILED DESCRIPTION OF PREFERRED EMBODIMENTS

Figure 3:
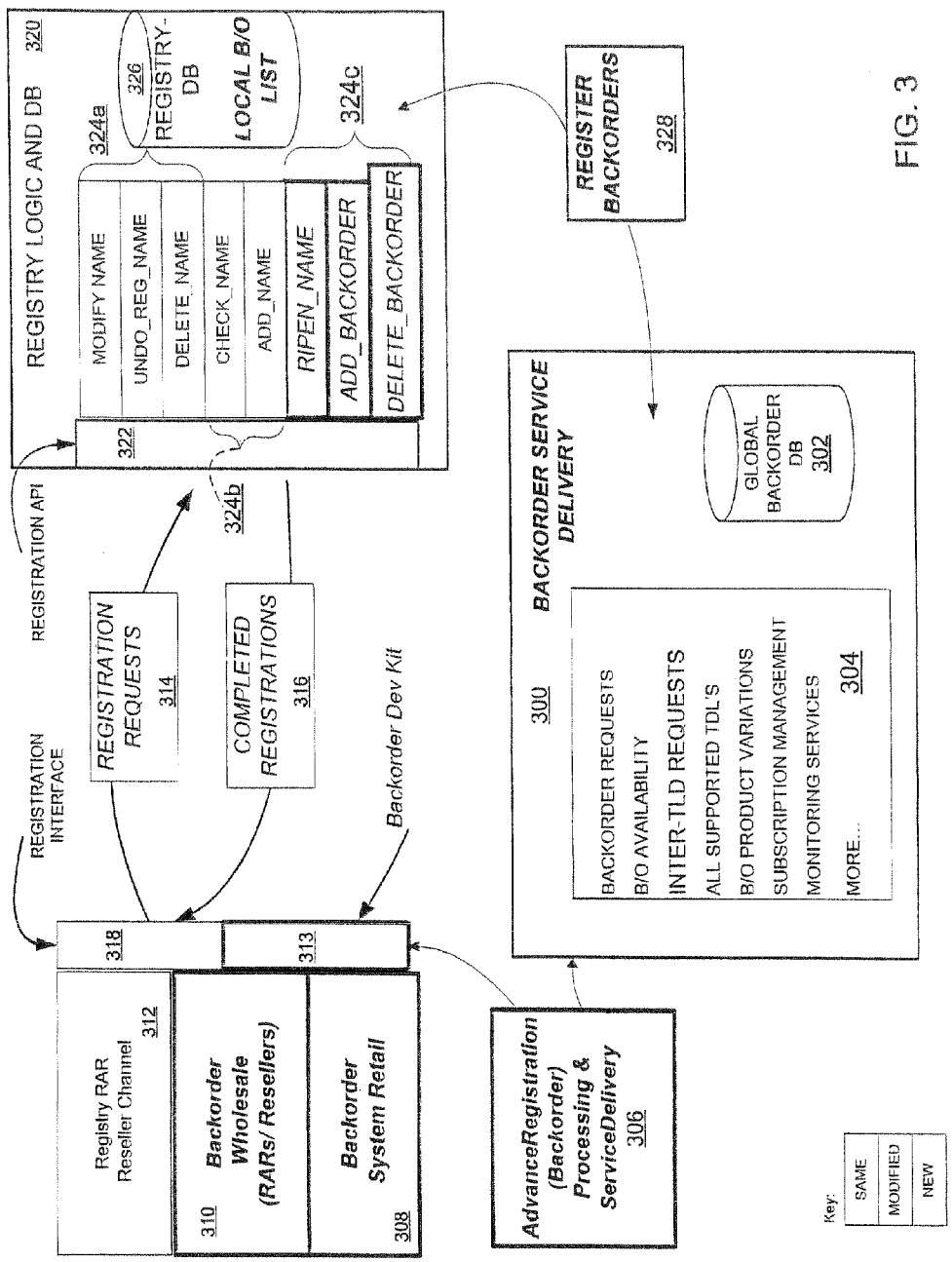
FIG. 3 illustrates system components and illustrative registry commands consistent with the present invention.

To overcome the deficiencies of the prior art domain name registration system models, a procedure is desired that provides greater certainty of success than is available in the typical "rush-to-register" system. Various solutions have been offered in an attempt to provide such an advantage. Two such solutions are presented by the systems and methods disclosed in U.S. Patent Publication Nos. US 2002-0091703 A1 and US 2002-0091827 A1, both of which are hereby incorporated by reference in their entirety. However, even those systems leave room for improvement.

For example, the system disclosed in publication US 2002-0091703 A1 requires monitoring communications between one or more registrars and one or more registries. Successful registration is based on ascertaining the expected date by which the registry will delete a current domain name registration. The system then submits frequent registration requests around the expected registration deletion date. Publication US 2002-0091827 A1 discloses an improved system in that it enables partnering with the registry in order to receive advanced notice of when a registry will purge a domain name registration. However, that system involves the registry sending "pending delete" notifications, preceding the actual purge for each domain name the registry is deleting. Such a system uses unnecessary system resources to provide the pending delete notifications for the domain names for which no subsequent registration may be desired.

Preferred embodiments of the present invention, on the other hand, provide additional improvements and present a more elegant solution for effecting successive domain name registrations. As described herein, the registry can maintain a data source indicating domain names for which backorder requests have been submitted. To implement an efficient, organized system for effecting successive registrations of domain names, the registry can also implement an integrated backorder system (which can simultaneously serve multiple registries, and registrars). Modified registration commands can also be implemented to take into account the presence of a backorder when receiving a request to register a given domain name. If a backorder exists for a domain name, a successive registration of the domain name can be limited to registration requests that originate from the integrated global backorder system.

As will be readily apparent to those skilled in the relevant art, the principles of the present invention presented in the following discussion can be implemented in domain names registration system employing various modifications, including those in which there are one or more registrars, one or more registries, or one or more systems providing backordering services. The present invention can also be implemented in both thick and thin registry models, models in which registrar and registry functions are combined in a single entity, or models in which backorder system functionality is provided by a component that is separate, integrated, or internal to either a registrar or registry. Each of these modification is considered equally within the scope of the present invention, as set forth in the appended claims.

FIG. 2 illustrates the deletion cycle of FIG. 1 modified consistent with the present invention. The numbers in FIG. 2 correspond to like numbers in FIG. 1. However, FIG. 2 also illustrates the incorporation of a backorder request at some point during time frame E. The backorder request entered during timeframe E is communicated to the registry maintaining the current registration for the domain name that is about to be deleted. After the deletion at point D, the domain name is only limitedly available. In addition to releasing a name at point D, the registry enters a block on the name because of the corresponding backorder. After point D, the domain name is only registrable by the backorder system that requested the backorder on behalf of the interested entity. The interested entity could be a registrar requesting a backorder on behalf of a registrant, or it could be the registrant directly. Direct registrant access to the backordering system would typically be applied for domains that operate with a combined registry/registrar model.

As a provider of backordering services, a backorder management system can greatly simplify the amount of work necessary for registries and registrars to support backorders on currently registered domain names. Nearly all of the logic to receive, complete, do accounting for, or otherwise process backorders, resides within the backorder management system. The backorder management system can be designed to support any number of registries, thus greatly reducing the cost and development time to implement a backorder service at any given registry. The backorder system can also give any number of registrars simultaneous access to backorders using a single application programming interface ("API") connected to multiple registries. To tie the registry into the backorder system, the registry preferably implements a few new registry commands, and modifies a few standard registry commands.

A schematic of these modifications is illustrated in FIG. 3. In FIG. 3, the backorder system 300 includes a global backorder database 302 which can contain backorder information for any of several different registries. The information stored in the backorder database 302 can contain an indication of the domain name for which the backorder exists, as well as an indication of the services that are being requested (which may include services in addition to pure backorders) 304. The backorder system 300 receives backorder requests 306 from an interested entity. This interested entity may include a customer from a backorder system retail presence 308 backorder system wholesale presence through registrars 310 or a registry or registrar domain name reseller entity 312. Backordering requests can be standardized through implementation of a backorder development kit 313.

Similarly, communications concerning registration requests 314 and completed registrations 316 can be communicated from the registering entities (308, 310, and 312) through a registration interface 318. Communications with the registry 320 can be standardized through a registration API 322. The registry 320 includes a data source 326 which can be a registry database for maintaining the data records for, the domain names administered by the registry, or any other source storing a local backorder list. The registry 320 also preferably implements various registry commands 324. These can include typical registry commands 324a, such as those commonly implemented by prior art registries. They can also include modified registry commands 324b, such as a modified command to check a status of a domain name or add a registration for a domain name. To efficiently implement the present invention, new registry commands can also be adopted. These new registry commands 324c can include commands to ripen a backorder, add a backorder, or delete a backorder. Backorder-specific communications can be communicated from the backorder system 300 to the registry 320 through a backorder communication link 328. The backorder communication link 328 can accomplish synchronization of the backorder records in the backorder system database 302 and the local registry backorder list in the registry's data source 326.

To make the system efficient for the registry 320, backorder requests can be placed directly with the backorder system 300. The backorders are then communicated to the registry 320 via the communication link 328. The unchanged registry commands 324a implemented by the registry allow registrars to modify the records for domain names they have registered in the standard manner. To tie the backorder system into the registry, the registry can implement modifications shown in the registry commands 324b and 324c. These modifications include altering the check status command to also determine and indicate the presence of a backorder when a request is made by a registrar to determine the availability of a domain name for registration. Similarly, the add registration command can be modified to also require a check of the domain name status to identify existing backorders. This will ensure that actions requested by the registrar will be handled with due consideration of the presence or absence of a backorder for the relevant domain name.

The new registry commands 324c handle the management of backorder requests stored by the registry 320 in the data source 326. These include registry commands to add a backorder record, delete a backorder record, or ripen a backorder into a successive registration. The registry can communicate with the backorder system over the internet using one or more TCP/IP connections. Each registry can maintain a local data source containing a list of domain names within the registry's domain that have backorders placed against them. This data source can be updated to match the backorder system database 302 in real time as backorders are placed through a registrar, or with a batch update process. The registry is also not dependent of the backorder system for normal registry command processing (through the commands 324a) that is unaffected by backorder status.

The database local to the backorder system can be a "thick" database, containing all of the customer information to add the domain name to a registry upon ripening. For registry simplicity, the data stored local to the registry can be "thin", containing a list of the backorder domain names.

A preferred system operation is illustrated as follows. When an entity places a backorder request for a domain name, an entry can be made at the backordering system and in the data source maintained at the registry. Upon expiration of a current domain name registration for the desired domain name, the registry can delete the domain name using its standard deletion process. However, because of the presence of a backorder record in the registry's data source, the registry maintains a "block" on the domain name after it has been deleted. If an entity tries to register the domain name using a standard registration channel (through the now-modified "add-name" registry command show at 324b in FIG. 3) the registry blocks the registration attempt because of the backorder record in the data source. The add request is blocked as long as there is one or more backorders for the name in the registry's data source. To fulfill or complete the backorder process, the backordering system can run real time or frequent batch processes to register the domain names that have been blocked by the registry. This can be done with or without receiving notification from the registry (i.e., it can operate with both push and pull communication paradigms).

Figure 4:
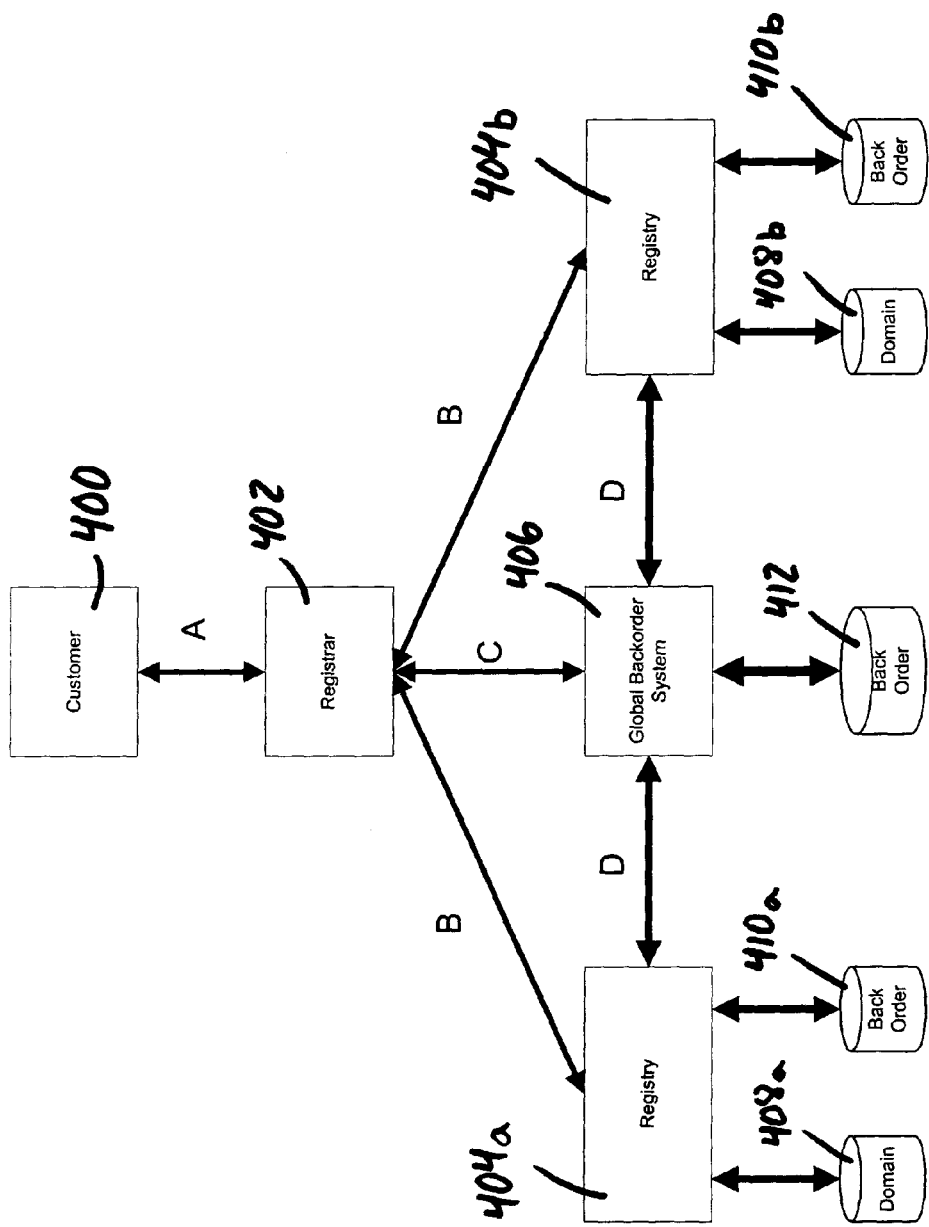
FIG. 4 schematically illustrates components of a preferred system, as well as communication links between system components.

FIG. 4 schematically illustrates the various communication links between components of a preferred system. The first connection A is between a customer 400 and a registrar 402. This connection is typically the customer's web browser communicating with the registrar's web site, an API extending some or all of the registrar's products to a reseller, or any other method to provide access to the registrar's services. Connection B illustrates the registrar-registry protocol (RRP) communication link between the registrar 402 and multiple registries 404a and 404b. Similarly, the registrar 402 can communicate with the global backorder system 406 through communication link C, which is preferably a secure socket layer extensible provisioning protocol (EPP) connection. The EPP is a connection-oriented application layer client-server protocol for provisioning and management of objects stored in a shared central repository. It employs the XML scheme and semantics for domain name related queries to the repository. The global backorder system 406 can communicate with the registries 404a and 404b via a secure socket layer TCP/IP connection D. It is through connection D that the global backorder system sends commands to add, delete, or ripen backorders stored at the registries 404a and 404b. In addition to maintaining a database 408a and 408b of domain names administered by the registries 404a and 404b, the registries 404a and 404b can maintain a separate database 410a and 410b to keep a list of domain names for which a backorder has been placed. The registry backorder databases 410a and 410b are synchronized with the global backorder database 412 maintained by the global backorder system 406. As will be readily apparent to those skilled in the art, the database of the registries 410a and 410b can be a separate or combined data source with the domain name databases 408a and 408b.

Figure 5:
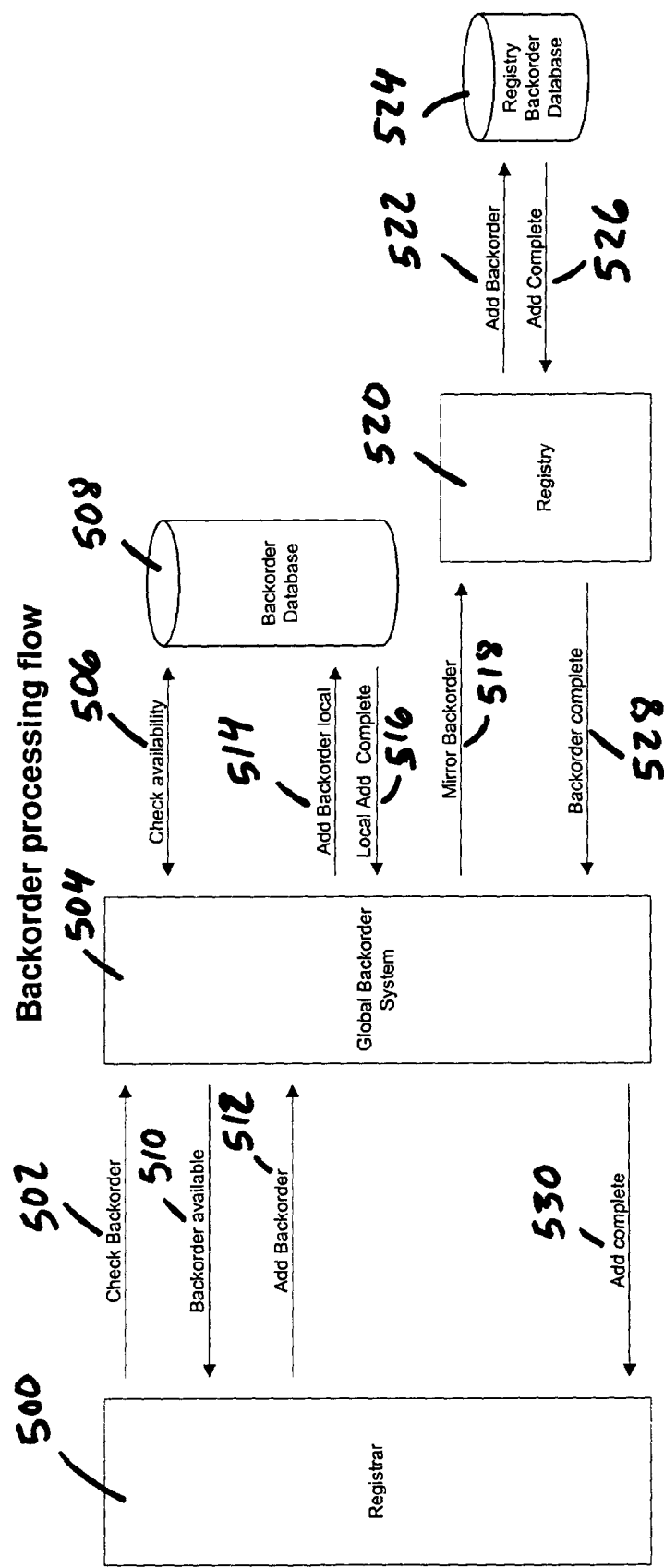
FIG. 5 depicts a communication flow diagram for processing a backorder request.

FIG. 5 illustrates a flow diagram for processing a backorder request. FIG. 5 illustrates sample communications between preferred system components, as required in order to implement a backorder request with the registry for a domain name. With particular reference to FIG. 5, a registrar 500, or other customer, sends a request to check availability of a backorder 502. The request is sent to the global backorder system 504, which then checks availability of the backorder 506 by accessing the backorder system database 508 to determine if a backorder already exists for the requested domain name. If there is no present backorder, a confirmation of backorder availability 510 is sent from the global backorder system 504 to the registrar 500. The registrar then can provide the global backorder system 504 with a request to add the backorder 512. The backorder request is added locally 514 to the backorder system database 508 and, when the local addition is confirmed 516, the backorder request can be mirrored 518 to the registry 520. The registry 520 adds the backorder 522 to its local backorder database 524. If the backorder is successfully added to the registry's local database 524, the registry's confirmation 526 is transmitted to the global backorder system 528. The global backorder system then confirms 530 to the registrar that the backorder request was successfully added.

After a backorder has been added to the registry records as illustrated in FIG. 5, efforts by registrars to subsequently register the domain name corresponding to the backorder will be precluded based on the presence of the backorder. These conditions are illustrated in FIGS. 6 and 7.

FIG. 6 illustrates a process in which a registrar attempts to add a registration for a domain name for which no backorder exists at the registry records. The registrar 600 implements the modified registry command to add a domain registration 602. The modified add-registration command 602 requires the registry to check for the existence of a backorder for the subject domain name. The registry 604 queries 606 the registry's backorder data source 608. When the data source 608 returns a confirmation 610 that there is no backorder for the queried domain name, the registry adds the registration 612 to the registry domain database 614. Confirmation of the successful addition 616 is transmitted 618 from the registry 604 to the registrar 600, completing the process.

FIG. 7 illustrates a system wherein the registrar requests the addition of a domain name registration for a domain name that does have a corresponding backorder request stored in the registry data source. As seen in FIG. 7, the registrar 700 issues a registry command to add the domain 702. The modified add-registration command 702, which is sent to the registry 704, requires the registry 704 to check the status of the domain name in order to determine if there is a corresponding backorder. The registry 704 queries 706 the registry backorder data source 708. When the registry backorder data source 708 responds with a blocked addition 710, the registry 704 has confirmed that a backorder exists for the requested domain name. Accordingly, the registry 704 sends a failed-addition notification 712 to the registrar 700.

Figure 8:
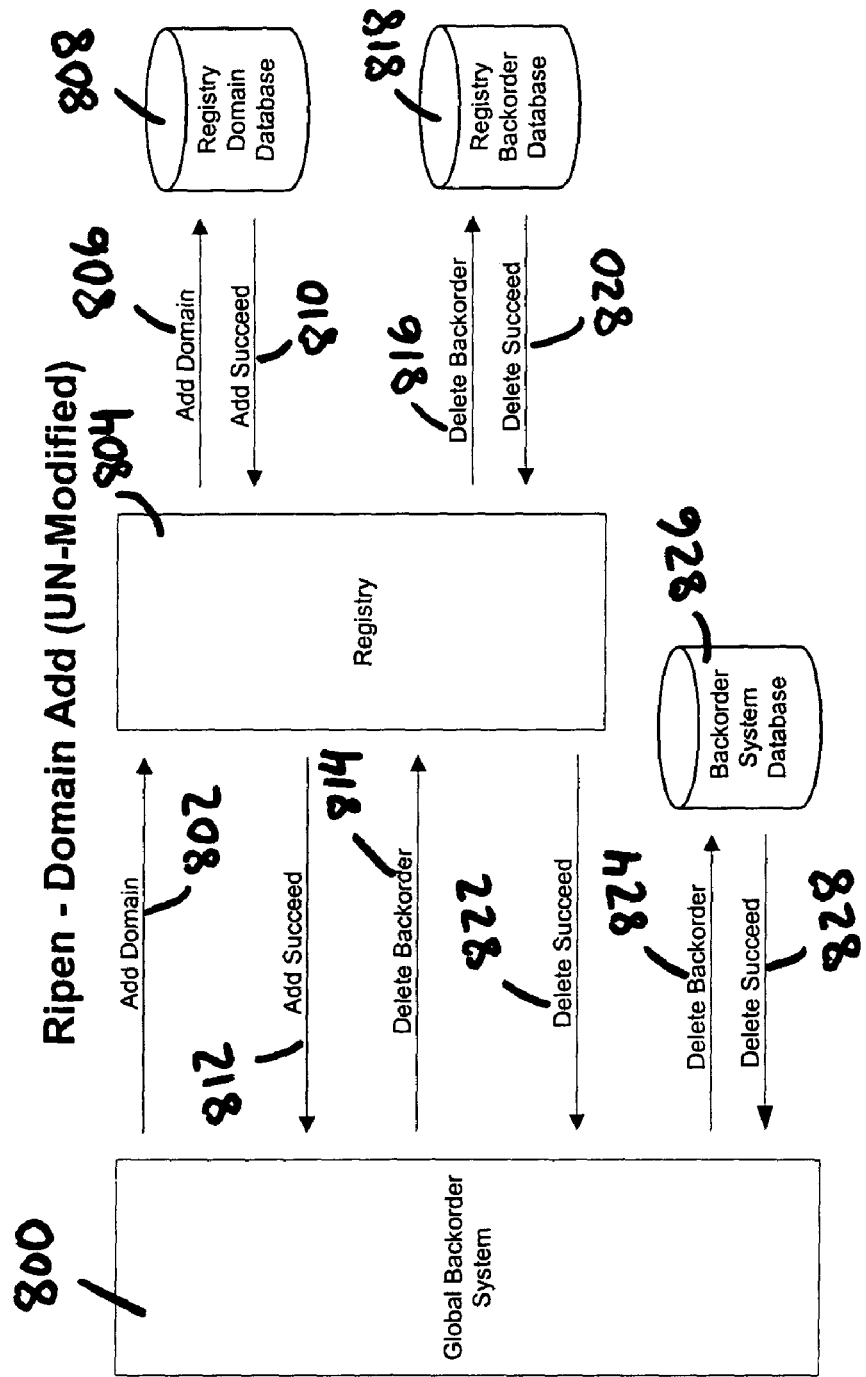
FIG. 8 depicts a communication flow diagram illustrating the procedure for ripening a backorder stored with a registry.

As can be seen from FIG. 7, when a backorder exists for a domain name maintained by a registry, even after the current registration for the domain name has been purged, no registrar may request a successive registration for the domain name. However, as illustrated in FIG. 8, the global backorder system may successfully request a successive registration for the domain name. In FIG. 8, the global backorder system 800 transmits a registry command to ripen the domain name 802. The request to ripen is sent to the registry 804. Upon receiving the request to ripen 802, the registry 804 adds the domain name 806 to the registry domain database 808. Confirmation of the addition 810 is received by the registry 804 and forwarded 812 to the global backorder system. Having successfully fulfilled the backorder by registering the domain name, the global backorder system no longer needs to maintain the backorder request with the registry records. Accordingly, the global backorder system 800 communicates a registry command to delete the backorder 814. The registry 804, upon receiving the delete command, deletes the backorder 816 from the registry backorder data source 818. Confirmation 820 of the successful deletion is forwarded 822 from the registry 804 to the global backorder system 800. Once the global backorder system 800 has received acknowledgement that the backorder is removed from the registry data source 818, the global backorder system issues a delete command 824 to remove the backorder from the local backorder system database. When the successful deletion is confirmed 828, indicating that the backorder system database 826 and the registry backorder data source 818 are synchronized, the process is complete.

It will be obvious to those skilled in the relevant art, that many modifications can be made to the presently preferred embodiments described herein without departing from the scope of the invention as set forth in the appended claims. For example, one modification may include implementation of a backorder queue to process multiple backorder requests for a given domain name. FIGS. 9a and 9b illustrate the benefits of such a modification for implementing a neat and orderly process for managing successive registrations of a domain name. FIG. 9a illustrates a typical system in which members of the public 900 comprise a disorganized mass of interested entities hoping to register desirable domain names 904a and 904b with a registry 902. By implementing embodiments of the present invention, modified to maintain a queue of backorder requests with the registry, distinct advantages are provided. As illustrated in FIG. 9b, the public 900 can be organized into orderly queues 908a and 908b corresponding to the desired domain names 904a and 904b. The queues 908a and 908b avoid the unreliable "rush-to-register," and provide organization and certainty for successive registrations. As can be seen in FIG. 9b, the member of the public 900 that has the first position in the queue 906a and 906b will have the first opportunity to register the corresponding domain name 904a and 904b through the registry or global backorder system 902. Although, for simplicity reasons, FIGS. 9A and 9B illustrate the public interacting directly with the registry, a registrar or backorder system typically can serve as an intermediary.

It will be obvious to those having skill in the art that many changes may be made to the details of the above-described embodiments without departing from the underlying principles of the invention. The scope of the present invention should, therefore, be determined only by the following claims.

The invention claimed is:

1. In a domain name registration system in which a registry maintains a current registration for a particular domain name, a method for effecting a succeeding registration of the particular registered domain name by backordering the particular domain name with the registry, the method comprising the steps of:
   provisioning a backorder system to receive a request to backorder a domain name having a current registration maintained by a registry;
   receiving the backorder request for the domain name prior to expiration of the current registration of the domain name;
   storing the backorder request in both a backorder service database 302 and in the registry 320; and
   implementing one or more new registry commands 324c for receiving a request at the registry to add a succeeding registration of the backordered domain name following expiration of the current registration, wherein:
   the new registry commands include a RIPEN_NAME command available only to the backorder system to ripen a backorder request stored in the registry into a new registration;
   at the registry, checking for the presence of a corresponding stored backorder request in response to receiving an ADD command; and
   responsive to a backorder being already stored in the registry, granting the request for the succeeding registration of the domain name if it comes from the backorder system as a RIPEN_NAME command 324c, and blocking the ADD command for the succeeding registration if it does not come from the backorder system.

2. The method of claim 1 further comprising the step of storing the backorder request in a data source 302 maintained by the backorder system.

3. The method of claim 2 further comprising the step of synchronizing the backorder system data source 302 with the registry data source 326.

4. The method of claim 1 and further comprising:
   receiving a second request for a succeeding registration of the domain name, storing the second request in the data source maintained by the registry;
   and the registry granting the first request before the second request, so as to define an ordered backorder queue encompassing the first request and second request.

5. The method of claim 1 wherein the new registry commands available only to the backorder system include a command to add a backorder request whereby the backorder system communicates the backorder request to the registry.

6. The method of claim 1 wherein the one or more registry commands include a qualified add command, the qualified add command being available to an interested entity, other than the backorder system, to request the subsequent registration of the domain name.

7. The method of claim 6 wherein the one or more registry commands further include a status-check command, in response to which the registry checks its data source for the existence of a backorder request directed to the domain name that is the target of the status-check command.

8. The method of claim 7 wherein the status-check command is implemented in response to the registry receiving the qualified add command.

9. The method of claim 7 wherein, following the lapse of the current registration, if the status-check command verifies that no backorder request exists, the registry can grant a first received succeeding registration request of the interested entity.

10. The method of claim 1 wherein the backorder system receives the backorder request from a registrar.

11. The method of claim 1 wherein the backorder system receives the backorder request from a current registrant of the domain name.

12. The method of claim 1 wherein the backorder system receives the backorder request from a prospective registrant of the domain name.

13. The method of claim 1 wherein the registry is a thick registry.

14. The method of claim 1 wherein the provisioning step includes provisioning the backorder system as an internal component of the registry.

15. The method of claim 1 further comprising:
receiving a confirmation from the registry that the domain name has been registered.

16. A machine-readable medium on which are stored computer program instructions for performing the method for effecting a succeeding registration of the domain name by backordering the domain name with the registry in advance of the current registration lapsing according to claim 1.

17. A method for establishing an orderly succession of registrations for a domain name maintained by a registry, the method comprising the steps of:
collecting one or more backorder requests with a backorder system, each backorder request identifying a desired domain name having a current registration maintained by a registry and requesting a succeeding registration of the desired domain name for an interested entity;
communicating the one or more backorder requests to the registry in the order in which the backorder requests were received;
in response to the registry purging a current registration for the desired domain name, requesting the succeeding registration of the desired domain name through the backorder system for the interested entity corresponding to a first-received of the one or more backorder requests; and
in response to the registry adding the desired domain name to a registry domain database, receiving a confirmation of the addition from the registry.

18. The method of claim 17 further comprising the step of implementing one or more registry commands by which the registry only enables the succeeding registration when requested by the backorder system for the interested entity corresponding to the first-received backorder request.

19. The method of claim 18 wherein the one or more registry commands include a command to ripen the backorder, the ripen command being available only to the backorder system for use in fulfilling the first received backorder request.

20. The method of claim 19 wherein the one or more registry commands further include a command, available only to the backorder system, to delete a previously collected backorder request; and
the method further comprising the step of, responsive to the first-received backorder request being deleted or ripened, enabling the ripen command for fulfillment of a second-received backorder request.

21. The method of claim 17 further comprising the step of implementing a registry command enabling a qualified addition of a new registration for the desired domain name, wherein:
the registry denies the qualified addition command during the current registration;
the registry denies the qualified addition command after the current registration is purged if the one or more backorder requests have been communicated to the registry; and
the registry approves the qualified addition command after the current registration is purged if no backorder request has been communicated to the registry.

22. The method of claim 17 wherein the backorder system can collect the one or more backorder requests from a registrar or registrant.

23. The method of claim 17 wherein the registry is a thick registry.

24. The method of claim 17 further comprising the step of provisioning the backorder system as an internal component of the registry.

25. A machine-readable medium on which are stored computer program instructions for performing the method for establishing an orderly succession of registrations for a domain name maintained by a registry according to claim 17.

26. A method for orderly processing multiple requests for a succeeding registration of a desired domain name, the method comprising the steps of:
offering an interface to a backorder service to receive one or more requests for a succeeding registration of a domain name having a current registration maintained by a registry;
communicating the one or more requests to the registry along with a suggested order for fulfilling the one or more requests upon a lapse in the current registration;
implementing a first registry command for use by the backorder service to request the succeeding registration;
implementing a second registry command for use by one or more other interested entities to request the succeeding registration;
rendering the first registry command effective, and the second registry command ineffective, for requesting the succeeding registration for the domain name corresponding to the one or more communicated backorder requests, whereby a successful succeeding registration request can only come from the backorder service when there are one or more backorder requests; and
registering the domain name upon receiving a registration request for the succeeding registration from the backorder service.

27. The method of claim 26 further comprising the step of enabling a second succeeding registration by the one or more other interested entities through the second registry command for a second domain that does not have a corresponding backorder request.

28. The method of claim 26 further comprising:
receiving a confirmation from the registry that the domain name has been registered.

29. A machine-readable medium on which are stored computer program instructions for performing the method for orderly processing multiple requests for a succeeding registration of a desired domain name according to claim 26.

30. A system for processing a backorder for a registered domain name, comprising:
- a backorder system that receives a request to backorder a domain name having a current registration; and
- a registry maintaining the current registration for the domain name;
- wherein the registry includes:
- a data source storing an indication that the domain name has a corresponding backorder request;
- an application programming interface bifurcating a first registry command available to the backorder management system from a second registry command available to one or more entities other than the backorder management system, wherein the first and second registry commands provide domain name registration functionality; and
- a registration management system with access to the data source to detect the backorder indication, and, upon detecting the backorder indication, disabling the second registry command to block a successive registration by the one or more entities, and enabling the first registry command to allow the successive registration by the backorder management system, and wherein the registration management system registers the domain name upon receiving a registration request.

31. The system of claim 30 wherein the first registry command is a ripen-backorder command to effect a registration for a backordered domain name.

32. The system of claim 30 wherein the second registry command is a modified add-registration command.

33. The system of claim 32 wherein the add-registration command is modified to require the registry to check the data source to detect the backorder indication.

34. The system of claim 30 wherein the register maintains the data source locally.

35. The method of claim 30 wherein the registry is chosen from a group consisting of a thick registry, a thin registry, and a registry offering combined registry-registrar functionality.

36. The system of claim 30 wherein the backorder system receives a confirmation from the registry that the domain name has been registered.

37. An Internet domain name registration system comprising:
- a registry that implements one or more registry commands accessible by one or more registrars to manage current registrations for one or more domain names maintained by the registry;
- a registry data source storing records indicating which of the domain names maintained by the registry have corresponding backorder requests;
- a backorder system administering collection and processing of the backorder requests and communicating with the registry to update the registry data source with a current status of the backorder requests;
- customized registry commands requiring the registry to identify the domain names having corresponding backorder requests before the registry grants a registration, to preclude a subsequent registration of the identified domain names by a registrar, and to afford the backorder system the opportunity to effect the subsequent registrations; and
- wherein the registry registers the domain names having corresponding backorder requests upon receiving a registration request.

38. The system of claim 37 wherein the customized registry commands include a ripen-backorder registry command available only to the backorder system to effect a subsequent registration of a domain name having a corresponding backorder, the subsequent registration following a lapse in a current registration for the domain name.

39. The system of claim 37 wherein the customized registry commands include a check-status command available to the registrar to determine a registration status for a specific domain name and a backorder status for the specific domain name.

40. The system of claim 39 wherein the customized registry commands further include a modified add-registration command accessible by the registrar, the modified add-registration command requiring implementation of the check-status command.

41. The system of claim 40 wherein the add-registration command fails in response to the check-status command identifying that the registration status or backorder status are valid.

42. The system of claim 37 wherein the registry data source is a database locally maintained by the registry.

43. The system of claim 37 wherein the backorder system receives a confirmation from the registry that the domain names that had corresponding backorder requests have been registered.

* * * * *